United States Patent
Pasqua et al.

(10) Patent No.: US 9,221,519 B2
(45) Date of Patent: Dec. 29, 2015

(54) MOTORISED BICYCLE GEARSHIFT WITH ACTUATION IN TRANSLATION OF THE DRIVE SHAFT

(71) Applicant: CAMPAGNOLO S.r.l., Vicenza (IT)

(72) Inventors: Paolo Pasqua, Camisano Vicentino (IT); Alberto Bortoli, Altavilla Vicentina (IT)

(73) Assignee: Campagnolo S.r.l., Vicenza (IT)

( * ) Notice: Subject to any disclaimer, the term of this patent is extended or adjusted under 35 U.S.C. 154(b) by 162 days.

(21) Appl. No.: 14/186,027

(22) Filed: Feb. 21, 2014

(65) Prior Publication Data

US 2014/0243127 A1    Aug. 28, 2014

(30) Foreign Application Priority Data

Feb. 22, 2013 (IT) .................. MI13A0253

(51) Int. Cl.
*B62M 9/122* (2010.01)
*B62M 9/132* (2010.01)

(52) U.S. Cl.
CPC ............... *B62M 9/122* (2013.01); *B62M 9/132* (2013.01)

(58) Field of Classification Search
CPC ......... B62M 9/12; B62M 9/122; B62M 25/08
See application file for complete search history.

(56) References Cited

U.S. PATENT DOCUMENTS

| | | | |
|---|---|---|---|
| 5,358,451 A | 10/1994 | Lacombe et al. | |
| 5,494,307 A | 2/1996 | Anderson | |
| 6,679,797 B2 * | 1/2004 | Valle .................. | B62M 25/08 474/78 |
| 2005/0266945 A1 * | 12/2005 | Meggiolan ............ | B62M 9/132 474/70 |

FOREIGN PATENT DOCUMENTS

| | | |
|---|---|---|
| EP | 1035010 A2 | 9/2000 |
| EP | 1357023 A1 | 10/2003 |
| EP | 1568595 A1 | 8/2005 |

OTHER PUBLICATIONS

Search Report and Written Opinion dated Nov. 26, 2013 received in the Italian priority Application No. MI20130253.

* cited by examiner

*Primary Examiner* — William E Dondero
*Assistant Examiner* — Mark K Buse
(74) *Attorney, Agent, or Firm* — Volpe and Koenig, P.C.

(57) ABSTRACT

A motorised bicycle gearshift that has a deformable articulated kinematic mechanism, fixed to a bicycle frame and capable of taking up different operating configurations; a chain guide, carried by the deformable articulated kinematic mechanism, capable of taking up different positions with respect to the bicycle frame according to the different operating configurations of the deformable articulated kinematic mechanism; a motor member, comprising a motor casing and a master drive shaft that projects directly from the motor casing, the motor member being mounted on the deformable articulated kinematic mechanism so as to deform it, thus making it take up the different operating configurations. The master drive shaft is immobile in rotation and mobile in translation in the axial direction, with respect to the motor casing. This gearshift provides greater precision in use, because the possible presence of dirt on the master drive shaft does not hamper the movements thereof.

11 Claims, 6 Drawing Sheets

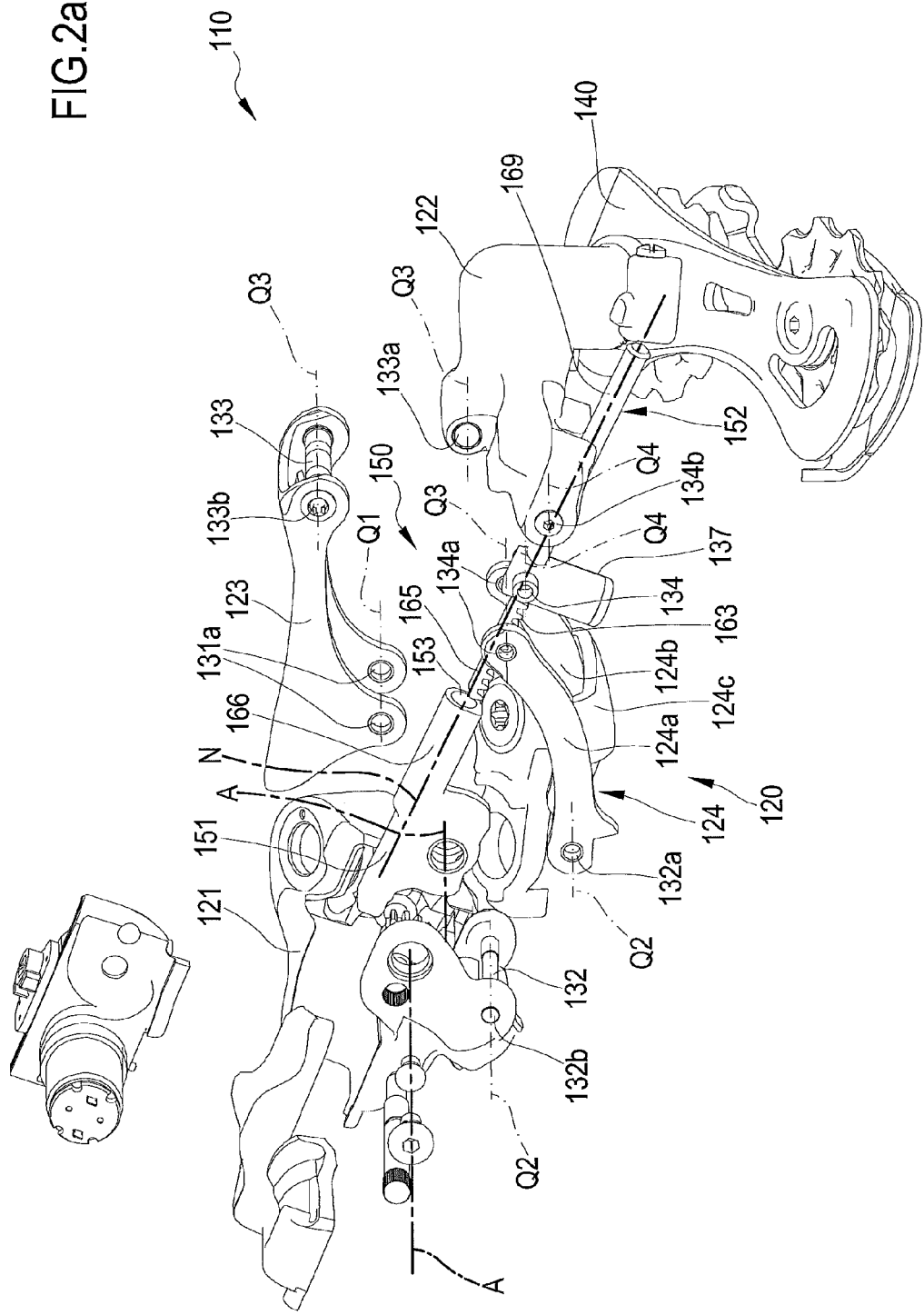

MOTORISED BICYCLE GEARSHIFT WITH ACTUATION IN TRANSLATION OF THE DRIVE SHAFT

FIELD OF INVENTION

The present invention refers to a bicycle gearshift, i.e. to a mechanical device that is part of a bicycle transmission and is suitable for causing the displacement of a chain between different toothed wheels, for this purpose moving a chain guide by which the chain itself is guided.

BACKGROUND

In the context of this patent description and the following claims, the gearshift being referred to can be, without distinction, either the rear one, which moves the chain between the different pinions associated with the rear wheel of the bicycle, or the front one, which moves the chain between the different chain rings associated with the pedal cranks.

Normally, the gearshift actuator device comprises a deformable articulated kinematic mechanism (typically an articulated quadrilateral or parallelogram) intended to be fixed to a bicycle frame and capable of taking up different operating configurations, so that the chain guide, carried by the deformable articulated kinematic mechanism, is able to take up different positions with respect to the bicycle frame (and thus with respect to the different toothed wheels) according to the different operating configurations of the deformable articulated kinematic mechanism.

The gearshift of the present invention is a motorised gearshift, in which the deformation of the deformable articulated kinematic mechanism is obtained with an electric motor that—following a suitable command input by the cyclist and through a suitable kinematic mechanism—moves different parts of the deformable articulated kinematic mechanism with respect to one another, deforming it and thus moving the chain guide.

Motorised gearshifts have been known for some time. These gearshifts, although able to have different configurations, still provide a rotary electric motor with a rotary drive shaft, the rotation of which—with suitable transmissions and reductions—is used to angularly move a rotary element of the deformable articulated kinematic mechanism or to move in translation (through screw-nut coupling) one part with respect to another of the deformable articulated kinematic mechanism, so as to determine the desired deformation of the deformable articulated kinematic mechanism.

An on-going objective of manufacturers of gearshifts is to improve the precision of actuation, upon which the ease and reliability of operation of the gearshift depends. This requirement is increasingly important the more the gearshift is intended to be used in high-level cycling competitions. In motorised gearshifts this requirement is particularly important because the deformation action of the deformable articulated kinematic mechanism is in this case very direct, without the mediation provided by the cables used in manual gearshifts.

The Applicant has realised that precision of actuation of gearshifts in which the deformation of the deformable articulated kinematic mechanism is obtained by translation of one part with respect to another can ensure greater precision. However, the Applicant has also realised that, particularly in such gearshifts, precision can be disturbed by dirt that, through use on the road, can build up on the parts of the gearshift the move with respect to one another.

SUMMARY

Therefore, the present invention relates to a gearshift that is able to take up different operating configurations.

More specifically, a motorised bicycle gearshift according to the invention comprises:
  a deformable articulated kinematic mechanism, intended to be fixed to a bicycle frame and capable of taking up different operating configurations;
  a chain guide, carried by the deformable articulated kinematic mechanism, capable of taking up different positions with respect to the bicycle frame according to the different operating configurations of the deformable articulated kinematic mechanism;
  a motor member, comprising a motor casing and a master drive shaft that projects directly from the motor casing, the motor member being mounted on the kinematic mechanism articulated so as to deform it, thus making it take up the different operating configurations;
  according to the invention, then, the master drive shaft is immobile in rotation and mobile in translation in the axial direction, with respect to the motor casing.

It should be noted that the term "shaft" referring to the master drive shaft does not imply rotation thereof, but rather only translation in the axial direction.

The Applicant has found that such a gearshift provides greater precision during use, because the possible presence of dirt on the master drive shaft does not hamper the movements thereof: these movements are indeed simple translation movements. On the other hand, there are no relative movements of elements meshed together, the typical situation in which the presence of dirt increases friction (even by a great deal), compromising the precision of operation.

This embodiment of the bicycle gearshift can be further improved through the following additional characteristics that can be combined together as desired.

The motor member can comprise a motor element capable of directly producing the translation movement of the master drive shaft.

Preferably, however, the motor member comprises a rotary electric motor, a primary drive shaft set in rotation by the rotary electric motor, and a transmission kinematically arranged between the primary drive shaft and the master drive shaft, in which the rotary electric motor, the primary drive shaft and the transmission are completely enclosed in the motor casing.

In this way, a rotary electric motor is thus used, which is appreciated for its simplicity, reliability and low cost; the fact that the casing completely encloses the rotary electric motor with its primary drive shaft, together with the transmission (which transforms the rotary motion of the rotary electric motor into linear motion of the master drive shaft), ensures that the parts of the motor member exposed to the possible deposit of dirt do not comprise parts meshed together but only static parts (the motor casing) or parts that are mobile with simple translation motion (the master drive shaft).

The transmission can be made in various ways. Preferably, the transmission comprises a secondary drive shaft, a rotation reduction gear train arranged between the primary drive shaft and the secondary drive shaft, and a pinion mounted so as to rotate as a unit on the secondary drive shaft, in which, moreover, a rack is formed on the master drive shaft, the pinion on the secondary drive shaft being engaged with the rack. This configuration makes it possible to have the necessary motion transformations in a small space, thus suitable for being completely housed inside the motor casing; in particular, with the reducing gear train a big reduction in rotation is obtained between primary drive shaft and secondary drive shaft, while the rotation (at extremely low speed) of the secondary drive shaft is easily transformed into translation of the master drive shaft through the pinion-rack pair.

Preferably, the rack is formed on a first portion of the master drive shaft that always stays inside the motor casing, in any operating configuration of the articulated kinematic mechanism. Even more preferably, the motor casing comprises a tubular portion in which the master drive shaft is slidably engaged, a sliding sealing gasket being arranged between the tubular portion and the master drive shaft, at a second portion thereof; in this way, the second portion of the master drive shaft can be worked so as to have a smooth surface, which promotes the seal in coupling with the gasket. Preferably, the gasket is a toroidal gasket, of the type commonly known as O-ring.

Preferably, the primary drive shaft and the secondary drive shaft are arranged along respective primary and secondary axes that are parallel to one another, and the gear train comprises rotary members having rotation axes that are perpendicular both to the primary axis and to the secondary axis. This arrangement promotes compactness of the transmission.

Preferably, the transmission comprises a gear pair with unidirectional motion transmission, in the direction from the primary drive shaft to the master drive shaft. Even more preferably, the gear pair with unidirectional transmission comprises a worm screw coupled with a toothed sector; this solution, which is mechanically simple, makes it possible to best exploit a 90° change in the direction of the rotation axis.

As stated above, the gearshift being referred to can be the rear one or the front one.

In preferred embodiments, the gearshift is a rear gearshift, in which:
the deformable articulated kinematic mechanism is an articulated quadrilateral kinematic mechanism (four-bar linkage), having a base body and a mobile body connected together through a pair of connecting rods articulated to the base body and to the mobile body at four pin elements;
the motor member is mounted on the articulated quadrilateral kinematic mechanism between a first and a second area thereof, the distance of which varies as a function of the operating configuration of the articulated quadrilateral kinematic mechanism.

In this way, the special features of the motor member with actuation in translation of the master drive shaft are best exploited: the deformations of the articulated quadrilateral necessary for gearshifting are indeed obtained with relatively little effort, and this promotes precision of actuation.

In preferred embodiments, the motor member is mounted on the articulated quadrilateral kinematic mechanism
with the motor casing carried by a first of the four pin elements, and
with the master drive shaft constrained to a second of the four pin elements, diagonally opposite the first.

The resulting arrangement is thus according to a diagonal of the articulated quadrilateral and thus allows the master drive shaft to operate in the most kinematically favourable conditions, ensuring the best precision and reliability of operation of the gearshift.

In other preferred embodiments, the motor member is mounted on the articulated quadrilateral kinematic mechanism
with the motor casing hinged to the base body, close to a first of the four pin elements, and/or
with the master drive shaft constrained to the mobile body, close to a second of the four pin elements, diagonally opposite the first.

The assembly of the motor casing and/or the constraining of the master drive shaft on the base body can promote the solidity of the gearshift and can simplify its construction, since it does not involve any pin element.

Preferably, the master drive shaft is constrained to the deformable articulated quadrilateral kinematic mechanism (to the second of the four pin elements or to the mobile body) by means of a mechanical fuse, or a device for limiting the transmitted force. By mechanical fuse a mechanical element is meant, that is equipped with a limited and predetermined resistance to strain, less than the resistance of all the other elements. A device of this kind makes it possible to protect the gearshift and in particular the motor member from possible damage in the case of bangs on to gearshift, due to the bicycle falling or accidental collisions; in such situations, if the strain exceeds a predetermined threshold, the devices releases the master drive shaft from the pin, avoiding the transmission of dangerous forces.

The mechanical fuse can be made in various ways.

According to a preferred embodiment, the mechanical fuse comprises a seat formed in a body of the second pin, a counter-seat formed in the second portion of the master drive shaft opposite the seat, and a thruster slidably mounted in the seat, elastically pushed into engagement in the counter-seat. Preferably, the thruster is formed from a ball and a thrusting spring, compressed between the ball and a bottom adjustably associated with the seat. In this way, the intervention threshold of the mechanical fuse can be easily adjusted, by acting on the bottom so as to increase or decrease the thrust of the spring on the ball and therefore on the counter-seat in the master drive shaft.

It should be noted that the mechanical fuse is particularly important with this gearshift, in which the thrusting action of the motor member discharges exactly or approximately along the diagonal of the deformable articulated quadrilateral. Indeed, with this arrangement possible knocks on the gearshift can transmit very high stresses to the motor member.

BRIEF DESCRIPTION OF THE DRAWINGS

Further characteristics and advantages of the invention will become clearer from the following description of some preferred embodiments, made with reference to the attached drawings. In such drawings:

FIG. 1b is a section view of a detail of the gearshift of FIG. 1a;

FIGS. 2a and 2b are partially exploded perspective views, taken from different angles, of a gearshift according to the invention, in a second embodiment thereof;

DETAILED DESCRIPTION OF THE PREFERRED EMBODIMENTS

Figure 1A:
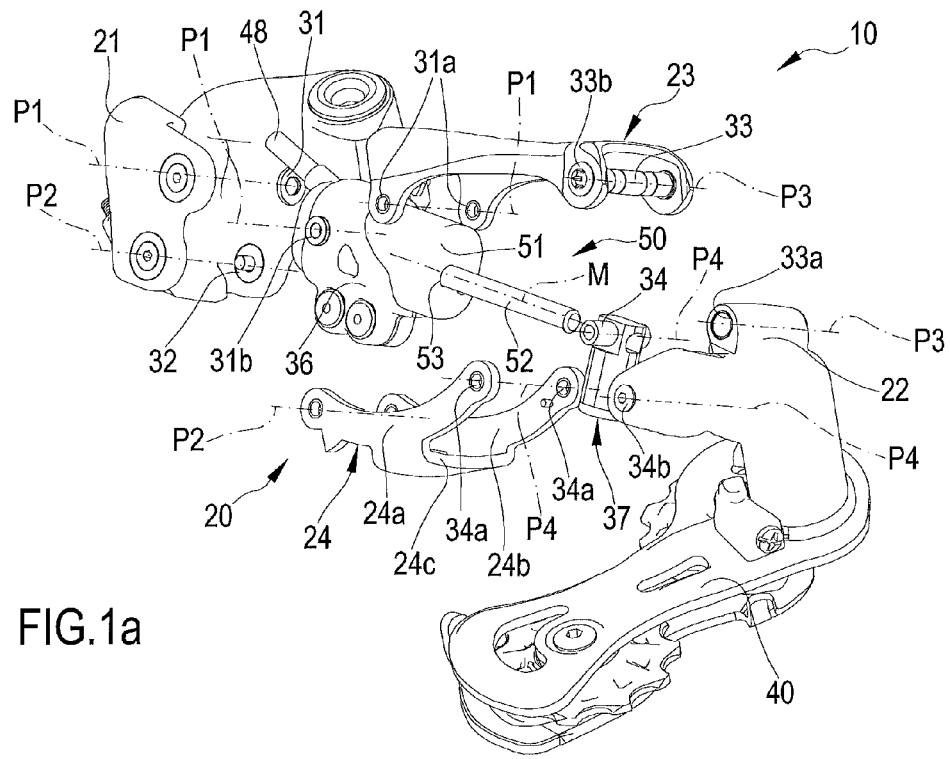
FIG. 1a is a partially exploded perspective view of a gearshift according to the invention, in a first embodiment thereof.

In FIG. 1a, reference numeral 10 wholly indicates a motorised bicycle gearshift according to a first embodiment of the invention, in particular and for example a rear gearshift, thus intended to be mounted on a bicycle frame close to a cogset, to move a transmission chain between the pinions of the cogset.

The gearshift 10 comprises a deformable articulated kinematic mechanism, in particular a kinematic mechanism in the form of a articulated quadrilateral (four-bar linkage) 20 formed from a base body 21, a mobile body 22 and two connecting rods between them: a connecting rod 23 (also known as outer connecting rod with reference to its location with respect to the bicycle on which the gearshift 10 is intended to be mounted) and a connecting rod 24 (also known as inner connecting rod with reference to its location with respect to the bicycle on which the gearshift 10 is intended to be mounted). The base body 21, the mobile body 22 and the two connecting rods 23 and 24 are articulated to one another according to four parallel hinging axes P1, P2, P3, P4 by four respective pin elements 31, 32, 33, 34, so as to form the aforementioned articulated quadrilateral kinematic mechanism 20. It should be noted that in figure 1a each of these axes is shown many times: since this figure is exploded, each axis is shown on each of the two parts that are hinged there. The base body 21 is intended to be mounted onto a bicycle frame, whereas the mobile body 22 carries a chain guide 40, thus capable of taking up different positions with respect to the bicycle frame according to the different operating configurations of the articulated quadrilateral kinematic mechanism 20.

It should be noted that the base body 21, the mobile body 22, the two connecting rods 23 and 24, and the pin elements 31, 32, 33, 34 can have any configuration, which can be more or less complex. In the illustrated example, the base body 21 has a relatively thick configuration, as does the mobile body 22; the outer connecting rod 23, on the other hand, has a substantially plate-like configuration, whereas the inner connecting rod 24 is formed of a monolithic structure with two parallel arms 24a and 24b joined by a bridge 24c. Again in the illustrated example, the pin element 31 is formed from two half-pins, formed on the base body 21 and inserted in hinging seats 31a formed in the outer connecting rod 23 and thus in hinging seats 31b formed on a support 36; the pin element 32 is formed by two half-pins, formed on the base body 21 and inserted in hinging seats 32a formed in the outer connecting rod 23; the pin element 33 is a simple pin, inserted in hinging seats 33a and 33b, formed respectively in the mobile body 22 and in the outer connecting rod 23; the pin element 34 is formed by half-pins formed on a body 37 and inserted in hinging seats 34a formed in the inner connecting rod 24 and thus in hinging seats 34b formed on the mobile body 22.

As far as the dimensions are concerned, in the shown gearshift 10 the distances between the hinge axes P1, P2, P3, P4 are in equal pairs: the distance between the axes P1 and P2 is equal to the distance between the axes P3 and P4, just as the distance between the axes P1 and P3 is equal to the distance between the axes P2 and P4. This means that the articulated quadrilateral kinematic mechanism 20 is more specifically a kinematic mechanism in the form of an articulated parallelogram, and that therefore—given that the base body 21 is mounted onto the bicycle frame—a deformation of the articulated quadrilateral kinematic mechanism 20 implies that the mobile body 22 moves with translation motion along a circular trajectory, defined by the connecting rods 23 and 24. If the articulated quadrilateral kinematic mechanism were not a parallelogram, the motion of the mobile body would not only have a translation component, but also a rotary component; such a situation is not usually desired, but it could be useful in certain conditions, to give certain movements to the chain guide.

The gearshift 10 also comprises a motor member 50, having an overall variable length along a motor axis M. The motor member 50 indeed in turn comprises a motor casing 51 and a master drive shaft 52 directly projecting from the motor casing 51, from an opening 53 formed in the motor casing 51, for different lengths at the different operating configurations of the articulated quadrilateral kinematic mechanism 20. The master drive shaft 52 is immobile in rotation and mobile in translation with respect to the motor casing 51.

The motor member 50 is mounted on the articulated quadrilateral kinematic mechanism 20 in a position such as to be able to deform it, so as to make it take up the different operating configurations with respect to the frame according to how much the master drive shaft 52 projects from the motor casing 51. More specifically, the motor casing 51 of the motor member 50 is carried by the support 36 and is thus constrained to the first pin element 31; the master drive shaft 52 is coupled with the body 37 and is then constrained to the pin element 34. As a result the motor member 50 is mounted along a diagonal of the articulated quadrilateral kinematic mechanism 20, between the opposite pin elements 31 and 34.

Figure 1B:
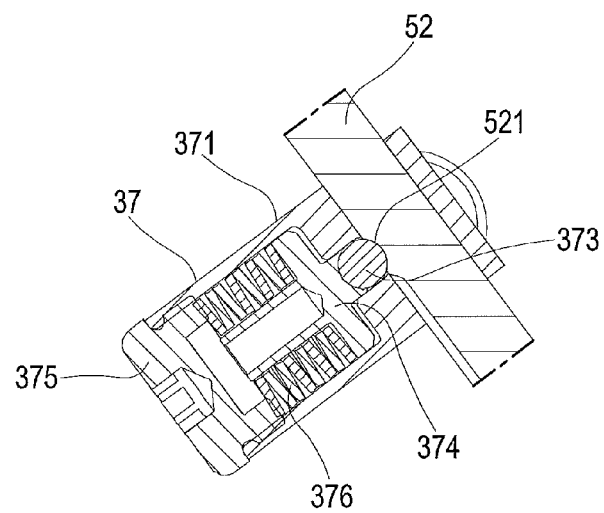
Figure 2B:
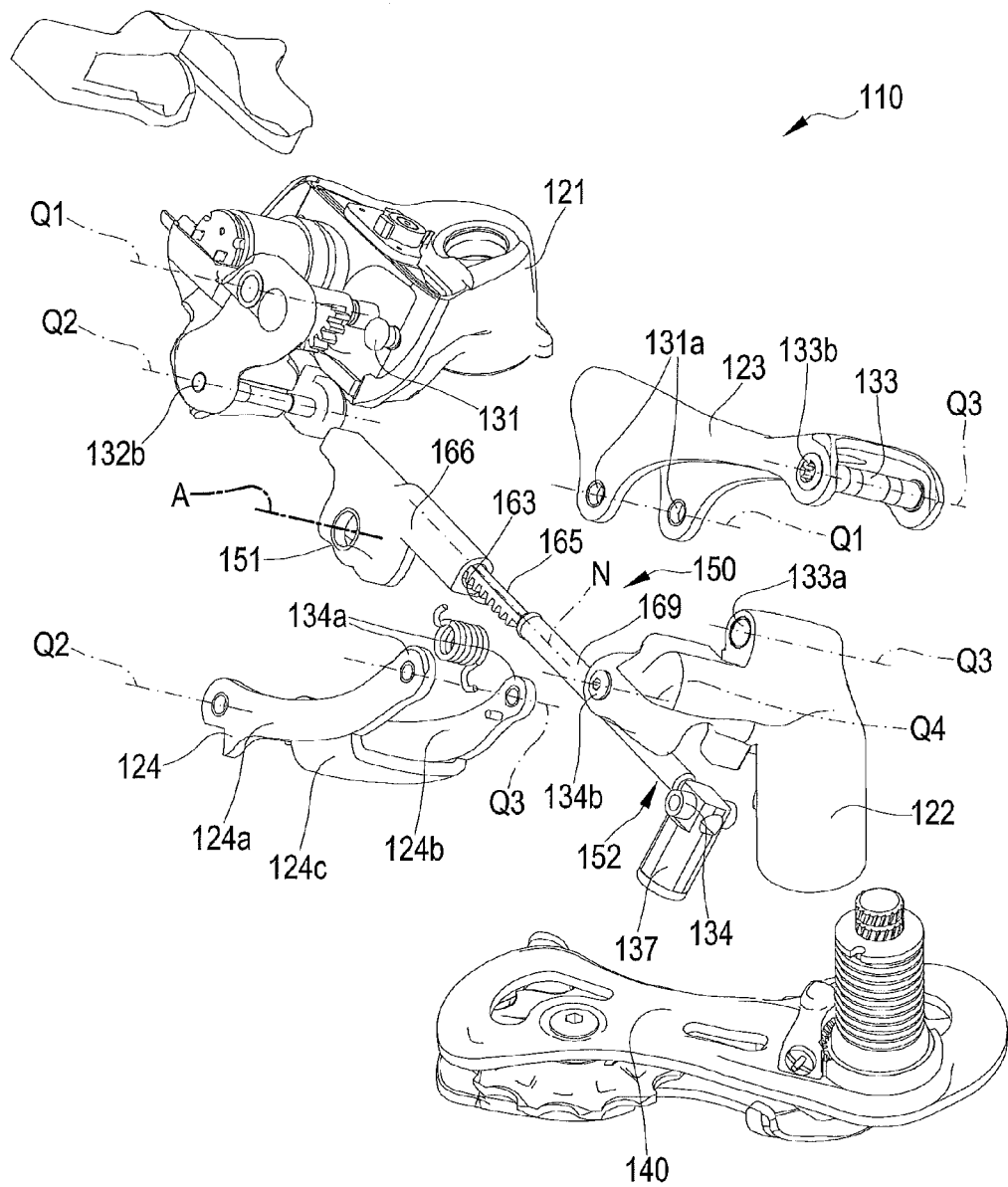
Figure 3A:
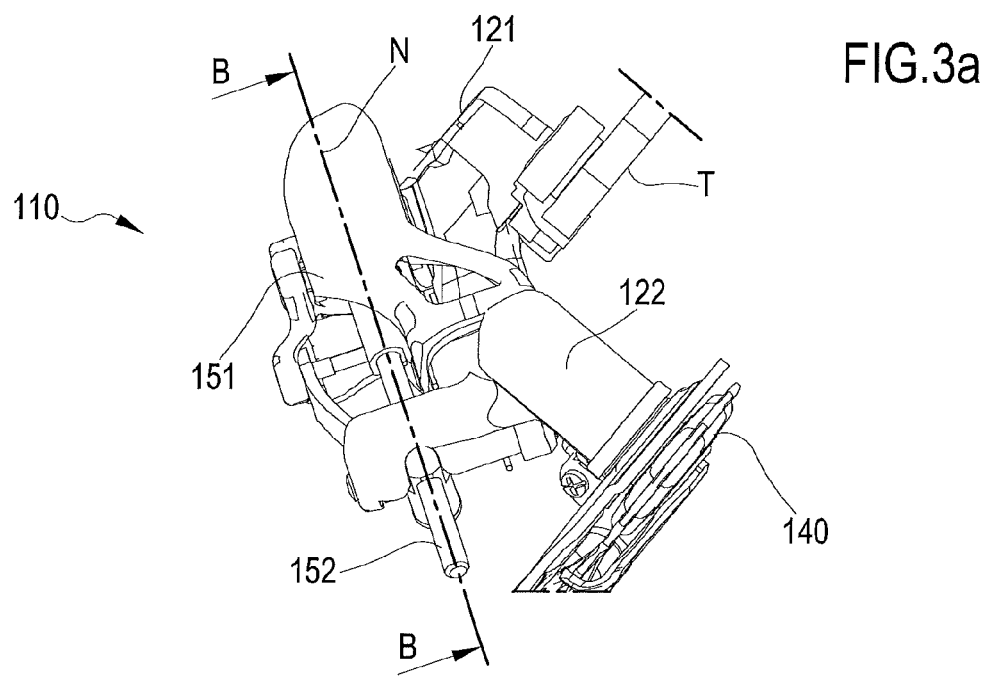
FIGS. 3a and 3b are, respectively, a view and a section (according to the line BB of FIG. 3a) of the gearshift of FIGS. 2a and 2b, in an operating configuration in which the motor member is completely extended.
Figure 3B:
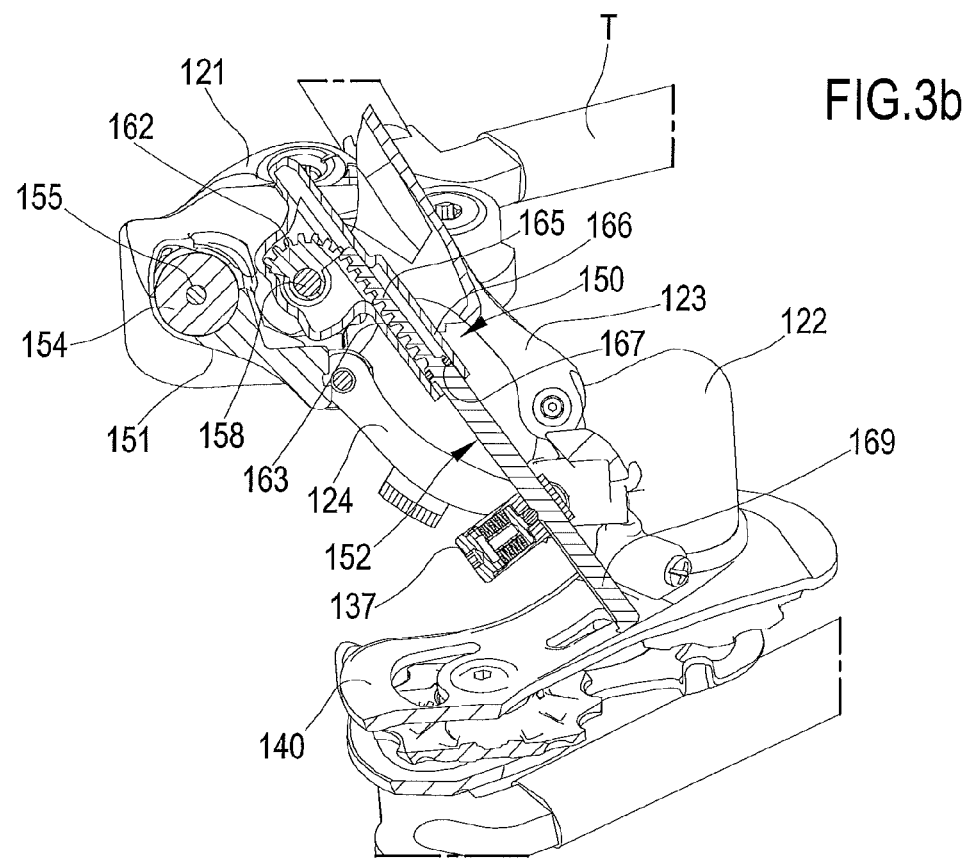
Figure 4A:
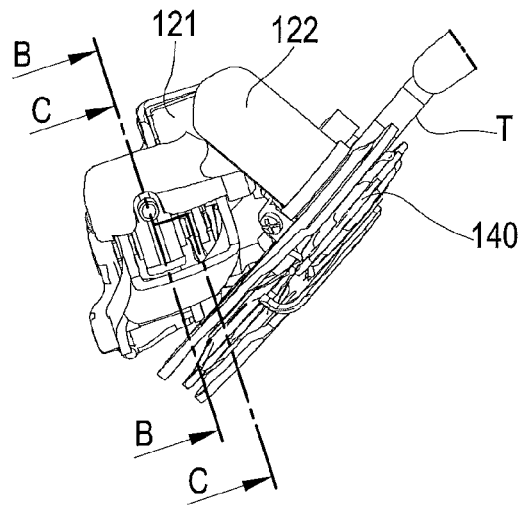
FIGS. 4a, 4b and 4c are, respectively, a view and two sections (according to the line BB and according to the broken line CC of FIG. 4a) of the gearshift of FIGS. 2a and 2b, in an operating configuration in which the motor member is completely retracted.
Figure 4B:
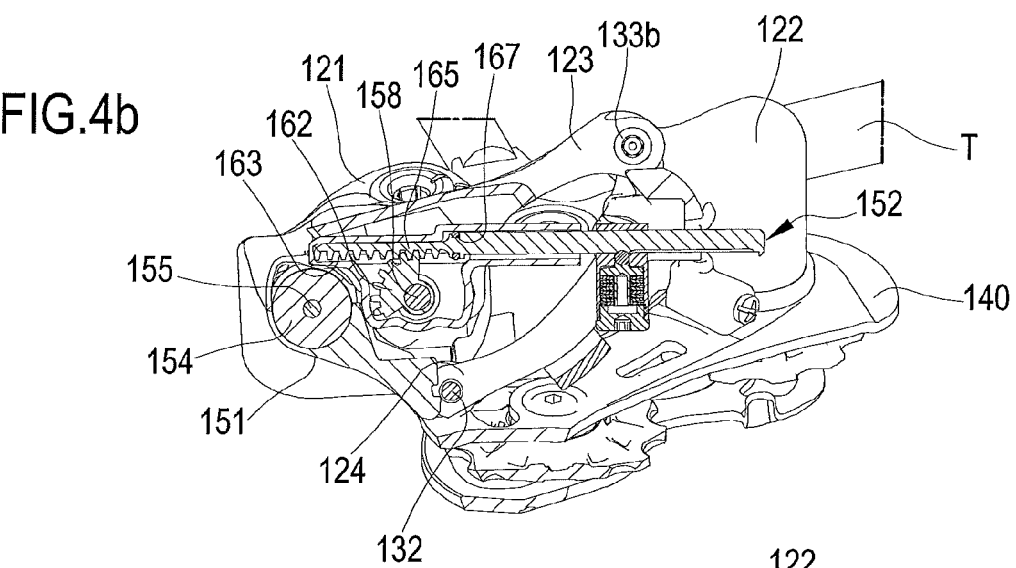
Figure 4C:
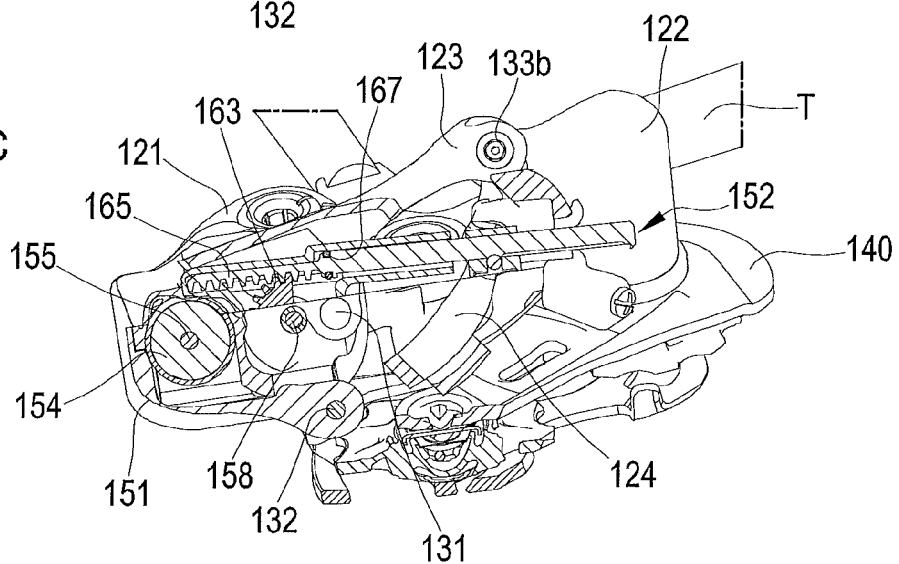
Figure 5:
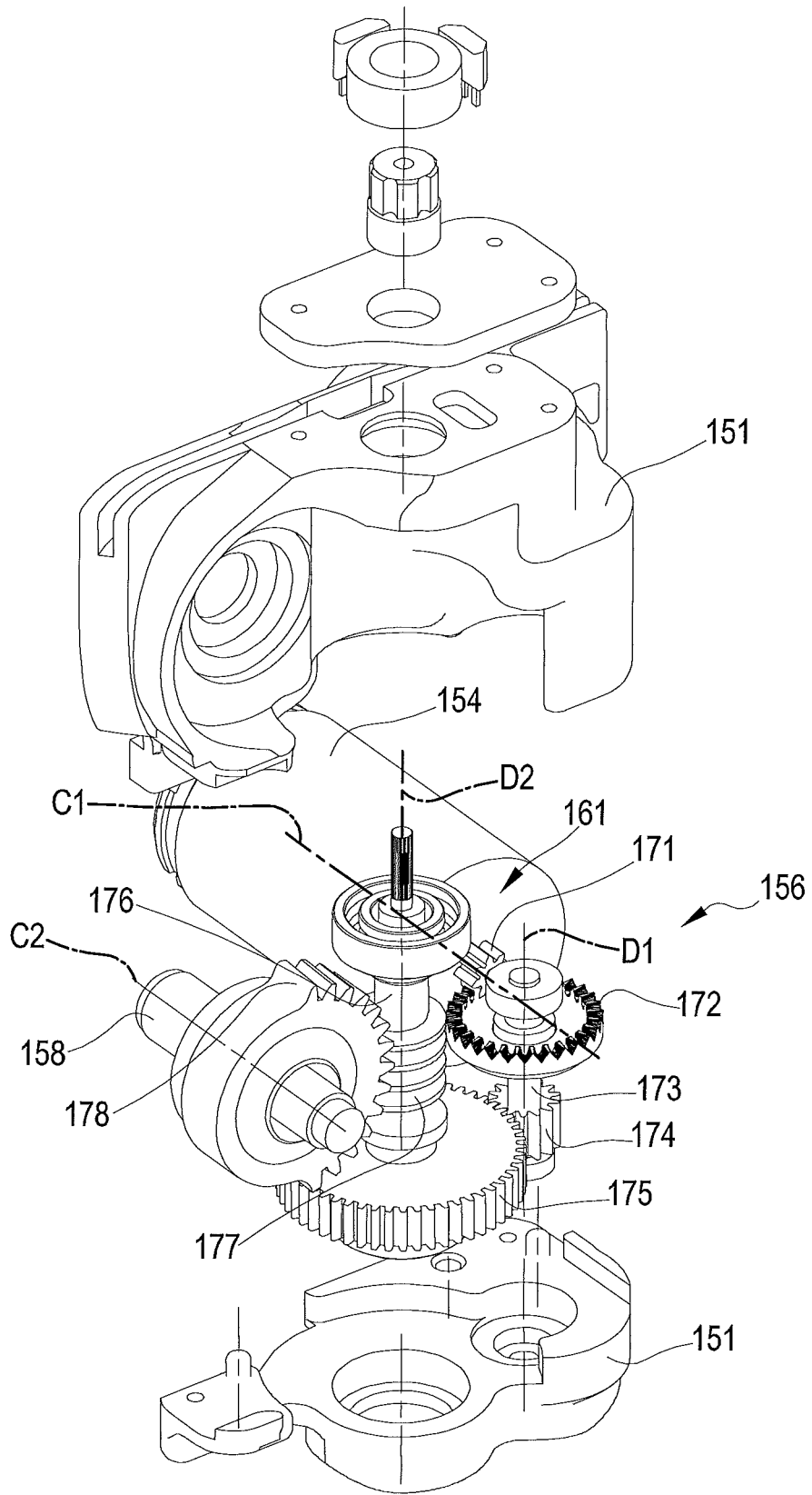
FIG. 5 is a partially exploded perspective view of part of the motor member of the gearshift of FIGS. 2a and 2b.

The body 37, with which the master drive shaft 52 is constrained to the deformable articulated quadrilateral kinematic mechanism 20, is a mechanical fuse, i.e. a device for limiting the force transmitted. For this purpose, as can be seen in FIG. 1b, a seat 371 is formed in the body 37 and a counter-seat 521 is formed in the master drive shaft 52, opposite the seat 371; the seat 371 has a thruster slidably mounted in it, elastically thrusted into engagement in the counter-seat 521. The thruster is formed by a ball 373 projecting from the seat 371 towards the counter-seat 521, a small plate 374 resting on the ball 373, a bottom 375 screwed into the seat 371 as adjustable base thereof, and a spring 376 compressed between the small plate 374 and the small plate 375. In this way, the intervention threshold of the mechanical fuse 37 can be easily adjusted, by acting on the bottom 375 so as to increase or decrease the thrust of the spring 376 on the small plate 374 and on the ball 373 and therefore on the counter-seat 521 in the master drive shaft 52.

The motor member 50 comprises, inside the casing 51, electro-mechanical means for actuating in translation the master drive shaft 52, powered and controlled by a cable 48. These means can be of a different type, and they are not illustrated with reference to the gearshift 10.

In FIGS. 2 to 5, reference numeral 110 wholly indicates a motorised bicycle gearshift according to a second embodiment of the invention, in particular and for example a rear gearshift, thus intended to be mounted on a bicycle frame close to a cogset, to move a transmission chain between pinions of the cogset.

The gearshift 110 is analogous to the gearshift 10, from which it differs—as shall be seen—above all for the motor member. For the sake of greater clarity of explanation, reference numerals similar to those of the gearshift 10, preceded by the number "1", will therefore be used for corresponding elements.

The gearshift 110 comprises a deformable articulated kinematic mechanism, in particular a kinematic mechanism in the form of a articulated quadrilateral 120 formed from a base body 121, a mobile body 122 and two connecting rods between them: a connecting rod 123 (also known as outer connecting rod) and a connecting rod 124 (also known as inner connecting rod). The base body 121, the mobile body 122 and the two connecting rods 123 and 124 are articulated together according to four parallel hinging axes Q1, Q2, Q3, Q4 by four respective pin elements 131, 132, 133, 134, so as to form the aforementioned articulated quadrilateral kinematic mechanism 120. It should be noted that in FIG. 2 each of these axes is shown many times: since this Figure is exploded, each axis is shown on each of the two parts that are hinged there. The base body 121 is intended to be mounted onto a bicycle frame T, whereas the mobile body 122 carries a chain guide 140, thus capable of taking up different positions with respect to the bicycle frame T according to the different operating configurations of the articulated quadrilateral kinematic mechanism 120.

Like for the gearshift 10, the base body 121, the mobile body 122, the two connecting rods 123 and 124, and the pin elements 131, 132, 133, 134 can have any configuration, which can be more or less complex. In the illustrated example, the base body 121 has a relatively thick configuration, as does the mobile body 122; the outer connecting rod 123, on the other hand, has a substantially plate-like configuration, whereas the inner connecting rod 124 is formed by a monolithic structure with two parallel arms 124a and 124b joined by a bridge 124c. Again in the illustrated example, the pin element 131 is formed by two half-pins, formed on the base body 121 and inserted in hinging seats 131a formed in the outer connecting rod 123; the pin element 132 is a simple pin, inserted in hinging seats 132a formed in the inner connecting rod 124 and thus in hinging seats 132b formed in the base body 121; the pin element 133 is a simple pin, inserted in hinging seats 133a and 133b, formed respectively in the mobile body 122 and in the outer connecting rod 123; the pin element 134 is formed by half-pins formed on a body 137 and inserted in hinging seats 134a formed in the inner connecting rod 124 and then in hinging seats 134b formed on the mobile body 122.

In the gearshift 110 illustrated, the distances between the hinging axes Q1, Q2, Q3, Q4 are in equal pairs: the distance between the axes Q1 and Q2 is equal to the distance between the axes Q3 and Q4, just as the distance between the axes Q1 and Q3 is equal to the distance between the axes Q2 and Q4. This means that the kinematic mechanism in the form of a articulated quadrilateral 120 is more precisely a kinematic mechanism in the form of an articulated parallelogram, and that therefore—given that the base body 121 is mounted onto the bicycle frame—a deformation of the articulated quadrilateral kinematic mechanism 120 implies that the mobile body 122 moves with translation motion along a circular trajectory, defined by the connecting rods 123 and 124.

The gearshift 110 also comprises a motor member 150, having an overall variable length along a motor axis N. The motor member 150 indeed in turn comprises a motor casing 151 and a master drive shaft 152 directly projecting from the motor casing 151, from an opening 153 formed in the motor casing 151, for different lengths at the different operating configurations of the articulated quadrilateral kinematic mechanism 120. The master drive shaft 152 is immobile in rotation and mobile in translation with respect to the motor casing 151.

The motor member 150 is mounted on the articulated quadrilateral kinematic mechanism 120 in a position such as to be able to deform it, so as to make it take up the different operating configurations with respect to the frame T according to how much the master drive shaft 152 projects from the motor casing 151. More specifically, the motor casing 151 of the motor member 150 is hinged to the base body 121, according to the axis A, parallel and close to the hinging axis Q1; the master drive shaft 152 is coupled with the body 137 and is thus constrained to the pin element 134. As a result the motor member 150 is mounted approximately along a diagonal of the articulated quadrilateral kinematic mechanism 120, between the opposite pin elements 131 and 134.

The body 137, with which the master drive shaft 152 is constrained to the articulated quadrilateral kinematic mechanism 120, is a mechanical fuse identical to the body 37 of the gearshift 10, and it will not therefore be described in detail; for its characteristics, refer to the body 37 described above.

The motor member 150 comprises, inside the casing 151, electro-mechanical means for actuating the master drive shaft 152 in translation.

More precisely, the motor member 150 comprises a rotary electric motor 154, a primary drive shaft 155 set in rotation by the rotary electric motor 154, and a transmission 156 kinematically arranged between the primary drive shaft 155 and the master drive shaft 152; the rotary electric motor 154, the primary drive shaft 155 and the transmission 156 are completely enclosed in the motor casing 151.

The transmission 156 in turn comprises a secondary drive shaft 158, a rotation reduction gear train 161 arranged between the primary drive shaft 155 and the secondary drive shaft 158, and a pinion 162 mounted so as to rotate as a unit on the secondary drive shaft 158; the master drive shaft 152 has a rack 163 formed on it with which the pinion 162 is in meshing engagement on the secondary drive shaft 158. The rack 163 is formed on a first portion 165 of the master drive shaft 152 that always remains inside the motor casing 151, in any operating configuration of the articulated quadrilateral kinematic mechanism 120, as can be seen from the comparison between FIGS. 3b and 4b/4c.

The motor casing 151 comprises a tubular portion 166 in which the master drive shaft 152 is slidably engaged; a sliding sealing gasket 167, preferably a toroidal O-ring, is arranged between the tubular portion 166 and the master drive shaft 152, at a second portion 169 thereof.

In the motor member 150, the primary drive shaft 155 and the secondary drive shaft 158 are arranged along respective primary C1 and secondary axes C2 that are parallel to one another. The gear train 161 comprises rotary members having auxiliary rotation axes D1 and D2, parallel to one another and perpendicular both to the primary axis C1 and to the secondary axis C2.

More specifically, the gear train 161 comprises, sequentially from the primary drive shaft 155 towards the secondary drive shaft 158: a pinion 171 with a small diameter, mounted so as to rotate as a unit on the primary drive shaft 155; a toothed wheel with axial teeth 172, engaged with the pinion 171 and mounted so as to rotate as a unit on a first auxiliary shaft 173, arranged according to the auxiliary axis D1; a pinion 174 with a small diameter, mounted so as to rotate as a unit on the first auxiliary shaft 173; a toothed wheel 175, engaged with the pinion 174 and mounted so as to rotate as a unit on a second auxiliary shaft 176, arranged according to the auxiliary axis D2; a worm screw 177, mounted so as to rotate as a unit on the second auxiliary shaft 176; a toothed sector 178, engaged with the worm screw 177 and mounted so as to rotate as a unit on the secondary drive shaft 158.

In this gear train 161, a great reduction in angular speed is obtained between the primary drive shaft 155 and the secondary drive shaft 158, thanks to the presence of the three strongly-reducing gears formed, respectively, by the pinion 171 and by the toothed wheel 172, by the pinion 174 and by the toothed wheel 175, by the worm screw 177 and by the toothed sector 178. Moreover, the gearing formed by the worm screw 177 and by the toothed sector 178, as well as allowing the rotation axis to be changed by 90°, is also a gear pair with unidirectional transmission, since it allows the transmission only in the direction from the auxiliary shaft 175 to the secondary drive shaft 158, whereas each transmission in the opposite direction is prevented. The unidirectionality is, as known, particularly sought after in the context of a bicycle gearshift like the gearshift of the invention, to prevent knocks on the chain guide 140 being able to cause displacements of the chain guide 140 itself and thus unwanted gear changes.

From the above description the characteristics and advantages of the motorised bicycle gearshift of the present invention are clear.

Thanks to the fact that the motor actuates the master drive shaft in translation rather than in rotation, the gearshift of the invention has excellent precision of actuation that is not compromised by the possible build-up of dirt during use. Indeed, the movements of the master drive shaft are simple translation movements. Rather, there are no relative movements of elements meshed together, the typical situation in which the presence of dirt increases friction, compromising the precision of operation.

What is claimed is:

1. Motorised bicycle gearshift, comprising:
   a deformable articulated kinematic mechanism, intended to be fixed to a bicycle frame and able to take up different operating configurations;
   a chain guide, carried by the deformable articulated kinematic mechanism, capable of taking up different positions with respect to the bicycle frame according to the different operating configurations of the deformable articulated kinematic mechanism;
   a motor member, comprising a motor casing and a master drive shaft directly projecting from the motor casing, the motor member being mounted on the articulated kinematic mechanism so as to deform it, thus making it take up the different operating configurations;
   wherein the master drive shaft is immobile in rotation and mobile in translation in the axial direction, with respect to the motor casing.

2. Gearshift according to claim 1, wherein the motor member comprises a rotary electric motor, a primary drive shaft moved in rotation by the rotary electric motor, and a transmission kinematically arranged between the primary drive shaft and the master drive shaft, wherein the rotary electric motor, the primary drive shaft and the transmission are completely enclosed in the motor casing.

3. Gearshift according to claim 2, wherein the transmission comprises a secondary drive shaft, a rotation reducing gear train arranged between the primary drive shaft and the secondary drive shaft, and a pinion mounted so as to rotate as a unit on the secondary drive shaft, wherein the master drive shaft also has a rack formed on it, the pinion on the secondary drive shaft being engaged with the rack.

4. Gearshift according to claim 3, wherein the rack is formed on a first portion of the master drive shaft that always remains inside the motor casing, in any operating configuration of the deformable articulated kinematic mechanism.

5. Gearshift according to claim 4, wherein the motor casing comprises a tubular portion in which the master drive shaft is slidably engaged, a sliding sealing gasket being arranged between the tubular portion and the master drive shaft, at a second portion thereof.

6. Gearshift according to claim 3, wherein the primary drive shaft and the secondary drive shaft are arranged along respective primary and secondary axes that are parallel to one another, and wherein the gear train comprises rotary members having rotation axes perpendicular both to the primary axis and to the secondary axis.

7. Gearshift according to claim 3, wherein the transmission comprises a gear pair with unidirectional motion transmission, in the direction from the primary drive shaft to the master drive shaft.

8. Gearshift according to claim 7, wherein the gear pair with unidirectional transmission comprises a worm screw coupled with a toothed sector.

9. Rear gearshift according to claim 1, wherein
   the deformable articulated kinematic mechanism is an articulated quadrilateral kinematic mechanism, having a base body and a mobile body connected together through a pair of connecting rods articulated to said base body and to said mobile body at four pin elements;
   the motor member is mounted on the articulated quadrilateral kinematic mechanism between a first and a second area thereof the distance of which varies as a function of the operating configuration of the articulated quadrilateral kinematic mechanism.

10. Rear gearshift according to claim 9, wherein the motor member is mounted with the motor casing carried by a first of the four pin elements and with the master drive shaft constrained to a second of the four pin elements, diagonally opposite the first.

11. Rear gearshift according to claim 9, wherein the motor member is mounted on the articulated quadrilateral kinematic mechanism, wherein the motor casing is hinged to the base body, close to a first of the four pin elements and the master drive shaft is constrained to the mobile body, close to a second of the four pin elements, diagonally opposite the first.

* * * * *